United States Patent
Cassiani

(10) Patent No.: US 8,960,755 B2
(45) Date of Patent: Feb. 24, 2015

(54) MOTOR VEHICLE LUGGAGE COMPARTMENT COVERING DEVICE

(71) Applicant: Fiat Group Automobiles S.p.A., Turin (IT)

(72) Inventor: Aldo Cassiani, Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 0 days.

(21) Appl. No.: 14/136,141

(22) Filed: Dec. 20, 2013

(65) Prior Publication Data
US 2014/0175821 A1    Jun. 26, 2014

(30) Foreign Application Priority Data
Dec. 21, 2012 (IT) ............... TO2012A1128

(51) Int. Cl.
  *B60R 5/00* (2006.01)
  *B60R 5/04* (2006.01)
(52) U.S. Cl.
  CPC ...................... *B60R 5/045* (2013.01)
  USPC ..................... 296/37.16; 296/24.43
(58) Field of Classification Search
  USPC .......................... 296/24.43, 37.16
  See application file for complete search history.

(56) References Cited

U.S. PATENT DOCUMENTS

| 4,479,675 A | * | 10/1984 | Zankl ..................... 296/37.16 |
| 4,648,648 A | * | 3/1987 | Shigesada et al. ......... 296/37.16 |
| 5,865,497 A | * | 2/1999 | Klein et al. ............. 296/146.8 |
| 6,231,096 B1 | * | 5/2001 | Bollmann et al. ......... 296/37.16 |

FOREIGN PATENT DOCUMENTS

| DE | 34 05 096 C1 | 7/1985 |
| DE | 297 05 188 U1 | 9/1998 |
| DE | 10 2009 015 290 A1 | 11/2010 |
| FR | 2959461 A1 | 11/2011 |

* cited by examiner

Primary Examiner — Joseph D Pape
(74) Attorney, Agent, or Firm — Dickstein Shapiro LLP

(57) ABSTRACT

A motor vehicle luggage compartment covering device has a parcel shelf defined by a panel hinged to two sides of the luggage compartment about a horizontal axis and having two rear holes; the device also has two ties provided with respective ropes which extend through said holes; the lower ends of the ropes are fixed to two weights; the upper ends, however, are attached to two hooking elements that are hung in a releasable manner to a tailgate of the luggage compartment; for each rope, the upper ends are provided with respective protrusions, which are integral with the ropes and engage respective retaining seats obtained in the hooking elements; the holes of the parcel shelf have a diameter which is higher than that of the protrusions and is lower than the size of the hooking elements.

7 Claims, 2 Drawing Sheets

MOTOR VEHICLE LUGGAGE COMPARTMENT COVERING DEVICE

The present invention relates to a motor vehicle luggage compartment covering device, provided with a parcel shelf and a pair of ties, which raise the parcel shelf together with a tailgate of the luggage compartment when the latter is opened.

BACKGROUND OF THE INVENTION

In motor vehicles the parcel shelf is defined by a panel having a front portion hinged to the sides of the luggage compartment about a horizontal axis, orthogonal to the vehicle advancement direction, and a rear portion provided with two holes engaged by respective sealing or capping elements, made of plastic material.

In some solutions, said sealing elements have a substantially U-shape and define respective openings, wherein the cables or ropes of the ties slide. The upper ends of the ties are defined by hooks, which are coupled in a releasable manner to the tailgate of the luggage compartment. The lower ends of the ties, normally, are defined by weights which tend to keep the ropes outstretched and vertical. When the tailgate is opened to access the luggage compartment, the ropes run through the openings of the sealing elements until the weights rest against a lower surface of the parcel shelf. From that moment on, the two weights lift the parcel shelf.

Typically, the hooks and the weights are made of plastic material, which is over-molded onto the ends of the ropes, so as to be integral with the ropes themselves.

The holes of the parcel shelf are made with a larger diameter with respect of the hooks: during the assembly step, the hooks are inserted into said holes and then, on the edge of said holes and about the ropes, the sealing elements are applied, to close the space between the edge of the holes and the ropes themselves.

It is felt the necessity to simplify the known solutions described above, eliminating the two sealing elements from the holes of the parcel shelf.

SUMMARY OF THE INVENTION

Purpose of the present invention is to provide a motor vehicle luggage compartment covering device, which allows to fulfill in a simple and economic way the necessity described above.

According to the present invention a motor vehicle luggage compartment covering device, as defined in claim 1, is provided.

BRIEF DESCRIPTION OF THE DRAWINGS

For a better understanding of the present invention is now described a preferred embodiment, purely by way of non-limiting example, with reference to the accompanying drawings, wherein.

DETAILED DESCRIPTION OF THE INVENTION

Figure 1:
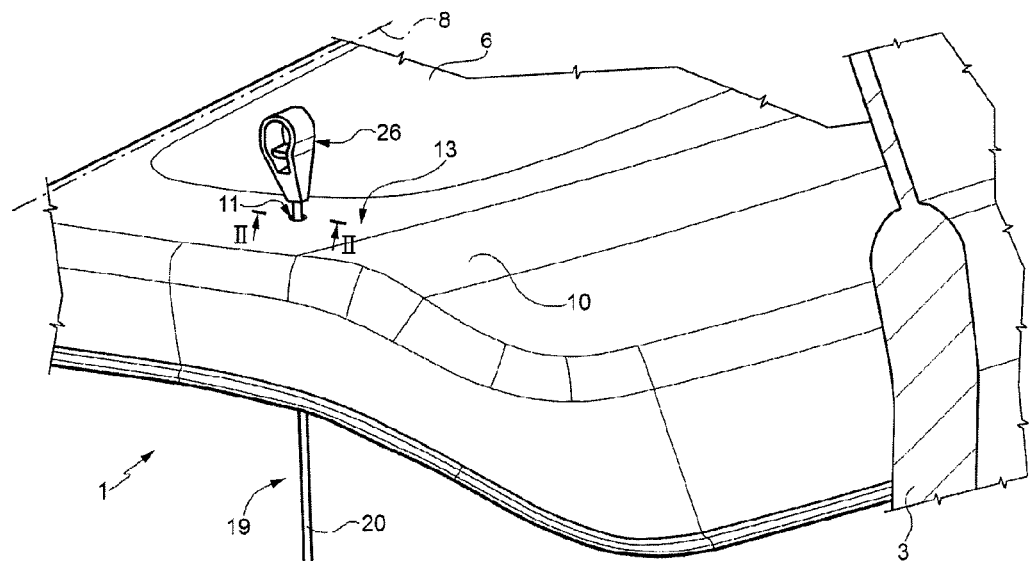
FIG. 1 is a perspective that shows, with parts removed for clarity, a preferred embodiment of the motor vehicle luggage compartment covering device according to the present invention.

In FIG. 1, the reference number 1 indicates, as a whole, a covering device (partially shown) that covers, i.e. superiorly delimits, a luggage compartment 2 of a motor vehicle when a tailgate 3 (partially and schematically shown) closes a rear opening of the luggage compartment 2.

The device comprises a parcel shelf 5 (partly shown) defined by a panel having a front portion 6 which is hinged in a known way and not illustrated to the two sides of the luggage compartment 2 about a horizontal axis 8. Therefore, the parcel shelf 5 can rotate about the axis 8 between a lowered position, wherein it is substantially horizontal and is resting on side supports (not shown) carried by the sides of the luggage compartment 2, and a raised position (not shown), wherein it is inclined to allow a user to easily access the luggage compartment 2 through the rear opening of the motor vehicle when the tailgate 3 is wide open.

Figure 2:
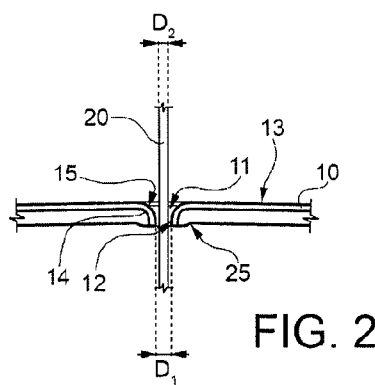
FIG. 2 is a section along the line II-II of FIG. 1.

The panel or parcel shelf 5 also comprises a rear portion 10 having two holes 11, only one of which is shown in FIG. 1. The holes 11 are symmetrical with respect to an ideal centerline vertical plane of the parcel shelf 5 and pass through the parcel shelf 5 itself. The section of FIG. 2 shows how the holes 11 have a diameter D1 relatively small, for example 3.5 mm, and are free of sealing or capping elements along its edge.

The edge of each hole 11 is not defined by a sharp edge, but by a side surface 12 which defines an extension of the upper surface 13 of the parcel shelf 5. In fact, about each hole 11, the parcel shelf 5 has a downward fold 14, which defines a convex curved surface 15 which connects the surface 12 to the surface 13. If the surface 13 is irregular (for example is defined by a hairy or rough layer) its irregularities (not shown) can be also found on the surfaces 12 and 15, and, therefore, tend to partially obstruct the empty space along the periphery of the hole 11.

Again with reference to FIG. 1, the device 1 comprises two ties 19, only one of which is partially illustrated. The ties 19 comprise respective cables or ropes 20, which extend through the holes 11 with clearance. In particular, the ropes have a diameter D2 equal to about 1 mm. For example, the ropes 20 are made of polyester.

The ties 19 also comprise respective lower elements 21, which are fixed to the lower ends 22 of the ropes 20 and define a weight to keep the ropes 20 themselves outstretched and vertical. The elements 21 have an upper surface 24 defining a shoulder, which comes into contact with a lower surface 25 of the rear portion 10 (FIG. 2), and then pushes the parcel shelf 5 towards its raised position when the ties 19 are pulled upwards. In particular, each element 21 is integral with the end 22, i.e. is not a distinct piece. For example, each element 21 is defined by an over-molded plastic material onto an anchor (not shown) made of polyamide and, in turn, over-molded onto the end 22.

Figure 3:
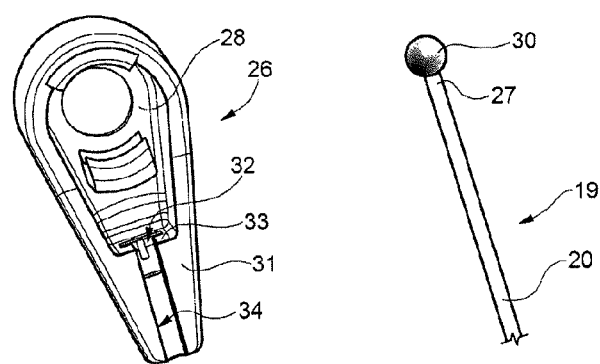
FIG. 3 shows, in enlarged scale and in exploded view, a tie of the device of FIG. 1.

As shown in FIG. 3, the ties 19 also comprise respective upper hooking elements 26, which are made of plastic material, are fixed to the upper end 27 of the ropes 20 and comprise, in turn, respective hooking portions 28 having a shape and size such to be hung in a releasable manner to respective lateral appendixes (not shown) that are fixed to the tailgate 3 (in particular fixed to the uprights which are arranged on opposite sides of the rear window of the tailgate 3). In this way, the ties 19 are pulled upwards when the tailgate is opened 3. For example, the lateral appendixes mentioned above are defined by the heads of two screws, while the hooking portions 28 are shaped so as to snap-fit to said heads.

According to an aspect of the present invention, in each tie 19, the element 26 is distinguished from the rope 20, i.e. is a piece which is made separately and then coupled to the end 27 during assembly of the device 1 on the motor vehicle.

In particular, the end 27 carries a protrusion or anchor 30, which is integral with the rope 20, is a piece separate from the element 26 and is fixed to the element 26 during assembly of the device on the motor vehicle 1. Preferably, the protrusion 30 is made of plastic material which is over-molded onto the end 27 and is more rigid than the material of the rope 20. For example, the material of the protrusion 30 is polypropylene. Alternatively, the rope 20 and the protrusion 30 may be obtained in a single piece.

Advantageously, the protrusion 30 comprises a sphere or a cylinder, coaxial to the rope 20.

The element 26 comprises a lower portion 31 having a retaining seat 32, which is engaged by the protrusion 30 and has a shape and/or size so as to hold in a fixed position the protrusion 30, after the latter has been inserted.

For example, the protrusion 30 is snap-fitted to the lower portion 31: in particular, the lower portion 31 has at least one tooth or a protuberance 33 which is coupled to the protrusion 30 and holds it in engagement in the retaining seat 32. Again with reference to FIG. 3, the lower portion 31, on one of its front face, has a groove 34, which upperly terminates in the retaining seat 32, is open at the bottom and has a cross section slightly greater than that defined by the diameter D2 so as to accommodate an end portion of the rope 20. To couple the two parts, the end portion of the rope 20 is arranged in the corresponding groove 34 and is then pulled downwards until snapping the protrusion 30 into the retaining seat 32.

Figure 4:
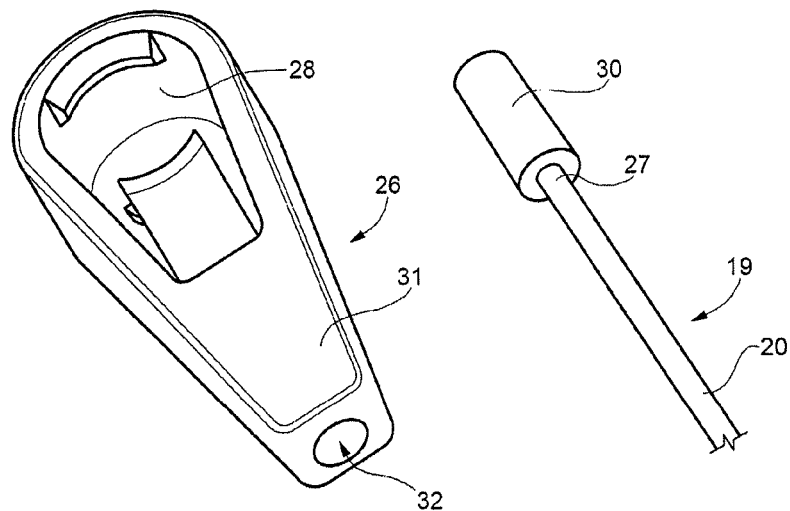
FIGS. 4 and 5 are similar to FIG. 3 and show respective variants of the tie.
Figure 5:
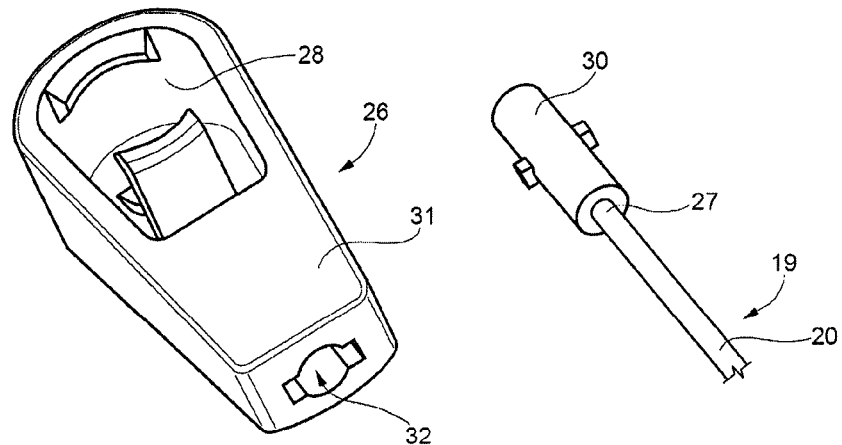

Alternatively or in combination with the snap-fitting, the protrusion 30 may be coupled to the lower portion 30:

by means of interference fit (FIG. 4): the retaining seat 32 and the protrusion 30 have sizes and/or shapes so as to remain coupled by friction after the protrusion 30 has been inserted by being forced into the retaining seat 32; for example, the retaining seat 32 is cylindrical, while the protrusion 30 has a truncated conical shape and the diameter of the upper base of the truncated cone is substantially equal to that of the retaining seat 32, while the diameter of the lower base is higher to generate the forcing;

by means of a bayonet coupling (FIG. 5): the protrusion 30 has at least one lateral tooth which engages a corresponding slot (not shown) internal to the lower portion 31, when the protrusion 30 is rotated after being inserted into the retaining seat 32.

With reference to FIG. 2, the diameter D1 of the holes 11 is higher than the diameter of the protrusions 30, and is lower than the size of the elements 26 and 21. For example, the diameter of the protrusions 30 is equal to about 3 mm. In this way, during assembly of the device 1 in the motor vehicle it is possible to insert the protrusions 30 in respective holes 11, from the bottom upwards, slide the ends 27 of the ropes 20 beyond the holes 11 and then fix the elements 26 to the protrusions 30 above the surface 13.

After fixing the elements 26 to the ropes 20, the ties 19 can no longer be pulled out of the holes 11, precisely because the elements 26 are larger than the holes 11 and the same are now fixed to the ropes 20. In particular, when the elements 26 are unhooked from the tailgate 3, the lower portions 31 simply rest on the upper surface 13 of the parcel shelf 5 due to the weight of the elements 21.

Alternatively or in combination with the above explanation for the coupling between the elements 26 and the ends 27, the elements 21 may be coupled to the end 22 in a similar way, i.e. may be distinguished from the ropes 20 and fixed to protrusions that are integral to the end 22.

From the foregoing it is evident how the device 1 has no need of sealing and/or capping elements along the edges of the holes 11. In particular, the empty space between the edges of the holes 11 and the ropes 20 is relatively small, therefore, the aesthetic appeal of the device 1 is satisfactory and the elements 21 and 26 cannot pass through the parcel shelf 5.

The characteristics described above also allow to couple the elements 26 to the ropes 20 relatively quickly. At the same time, the risks of disengagement of the element 26 from the ropes 20 are extremely low.

From the above it is, finally, evident that the device 1 described and illustrated may be subject to modifications and variants which do not depart from the scope of protection of the present invention, as defined in the appended claims.

In particular, the elements 21 and 26 may have shapes different from those illustrated by way of example.

The invention claimed is:

1. A motor vehicle luggage compartment covering device; the device comprising:
 a parcel shelf comprising:
 a) a front portion adapted to be hinged, in use, to two sides of the luggage compartment about a horizontal axis, and
 b) a rear portion having two holes; two ties, comprising:
  a) respective ropes which extend through said holes;
  b) respective first elements fixed to the upper ends of said ropes and comprising respective hooking portions, adapted to be hung in a releasable manner, in use, to a tailgate provided to close the luggage compartment;
  c) respective second elements fixed to the lower ends of said ropes and having a shoulder, which comes into contact with a lower surface of said rear portion when said ropes are pulled upwards;
 wherein:
 the upper ends and/or the lower ends of said ropes carry respective protrusions, which are integral with said ropes;
 said first elements and said second elements are pieces separate from said ropes and said protrusions, wherein said first elements and said second elements each have respective retaining seats, and wherein said retaining seats are engaged by said protrusions and have a shape or size so as to remain engaged with said protrusions;
 said holes having a diameter which is greater than the diameter of said protrusions and is less than the diameter of said first and second elements.

2. The device according to claim 1, wherein said protrusions are made of plastic material, over-molded onto the ends of said ropes.

3. The device according to claim 2, wherein said protrusions are stiffer than said ropes.

4. The device according to claim 1, wherein said protrusions are snap-fitted in said retaining seats.

5. The device according to claim 1, wherein said protrusions are interference-fitted in said retaining seats.

6. The device according to claim 1, wherein said protrusions are bayonet-fitted in said retaining seats.

7. The device according to claim 1, wherein the edge of each said hole is surrounded by a downward fold of the parcel shelf and is defined by a side surface, which extends as a prolongation of an upper surface of the parcel shelf.

* * * * *